(12) United States Patent
Post et al.

(10) Patent No.: US 11,174,900 B2
(45) Date of Patent: Nov. 16, 2021

(54) ATTACHMENT OF DISK TO SHAFT USING A WEDGE

(71) Applicant: Hewlett-Packard Development Company, L.P., Houston, TX (US)

(72) Inventors: Alvin Marion Post, Vancouver, WA (US); Suresh Krishnamurthy, Belton, TX (US); Keith Jariabka, Portland, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 933 days.

(21) Appl. No.: 15/747,664

(22) PCT Filed: Oct. 26, 2015

(86) PCT No.: PCT/US2015/057306
§ 371 (c)(1),
(2) Date: Jan. 25, 2018

(87) PCT Pub. No.: WO2017/074294
PCT Pub. Date: May 4, 2017

(65) Prior Publication Data
US 2018/0216669 A1     Aug. 2, 2018

(51) Int. Cl.
*F16D 1/09*     (2006.01)
*F16H 55/52*     (2006.01)
(Continued)

(52) U.S. Cl.
CPC .............. *F16D 1/09* (2013.01); *F16D 1/072* (2013.01); *F16H 55/36* (2013.01); *F16H 55/38* (2013.01); *F16H 55/52* (2013.01)

(58) Field of Classification Search
CPC ........ F16B 2/04; F16B 2/14; Y10T 403/7062; Y10T 403/7064; Y10T 403/7066;
(Continued)

(56) References Cited

U.S. PATENT DOCUMENTS 1,403,064 A * 1/1922 Ungar ...................... F16D 1/09
                                                                                             403/266
4,171,939 A    10/1979 Harwath
(Continued)

FOREIGN PATENT DOCUMENTS

CN        1068937       2/1993
CN       204382837       6/2015
(Continued)

OTHER PUBLICATIONS

International Search Report and Written Opinion for International Application No. PCT/US2015/057306 dated Jul. 21, 2016, 11 pages.

*Primary Examiner* — Jonathan P Masinick
(74) *Attorney, Agent, or Firm* — Fabian VanCott

(57) ABSTRACT

In one example in accordance with the present disclosure an apparatus for attaching to a shaft using a wedge is described. The apparatus includes a disc having a longitudinal axis. At least a portion of the disc is insertable into a shaft and is expandable against an inside diameter of the shaft. The disc has a recess at the longitudinal axis. A wedge to be inserted into the recess pushes the portion of the disc that is insertable into the shaft against an inside diameter of the shaft.

16 Claims, 12 Drawing Sheets

(51) Int. Cl.
*F16H 55/36* (2006.01)
*F16D 1/072* (2006.01)
*F16H 55/38* (2006.01)

(58) Field of Classification Search
CPC ......... Y10T 403/7067; Y10T 403/7069; F16D 1/09; F16D 1/093; F16D 1/097; F16D 1/072; F16D 1/08; F16D 1/0829; F16D 1/0852; F16D 1/0876; F16D 1/0882; F16D 2001/0903; F16H 55/36; F16H 55/38; F16H 55/52
See application file for complete search history.

(56) References Cited

U.S. PATENT DOCUMENTS

| | | | |
|---|---|---|---|
| 5,318,374 A * | 6/1994 | Rumberger | F16B 4/006 403/277 |
| 7,248,814 B2 | 7/2007 | Kawai et al. | |
| 8,267,615 B2 * | 9/2012 | Zhang | F16D 1/0882 403/356 |
| 8,659,632 B2 | 2/2014 | Tsuchiya et al. | |
| 8,831,474 B2 | 9/2014 | Joo et al. | |
| 9,128,454 B2 | 9/2015 | Ikeda | |
| 2011/0206438 A1 | 8/2011 | Igarashi et al. | |
| 2011/0268499 A1 | 11/2011 | Zhang | |
| 2013/0028653 A1 * | 1/2013 | Boeing | F16D 1/096 403/1 |
| 2014/0093302 A1 * | 4/2014 | Ingles | F16B 4/006 403/28 |

FOREIGN PATENT DOCUMENTS

| | | |
|---|---|---|
| EP | 2713060 | 2/2014 |
| JP | S59148680 | 8/1984 |
| KR | 20100065468 | 6/2010 |

* cited by examiner

ATTACHMENT OF DISK TO SHAFT USING A WEDGE

BACKGROUND

Shafts are used in many devices to rotate components of the device. A disc, such as a pulley or gear, is secured to a shaft and applies torque to the shaft to turn the shaft, or it transmits torque to another part or system. In other examples, the shaft applies rotational torque to the disc.

BRIEF DESCRIPTION OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1A:
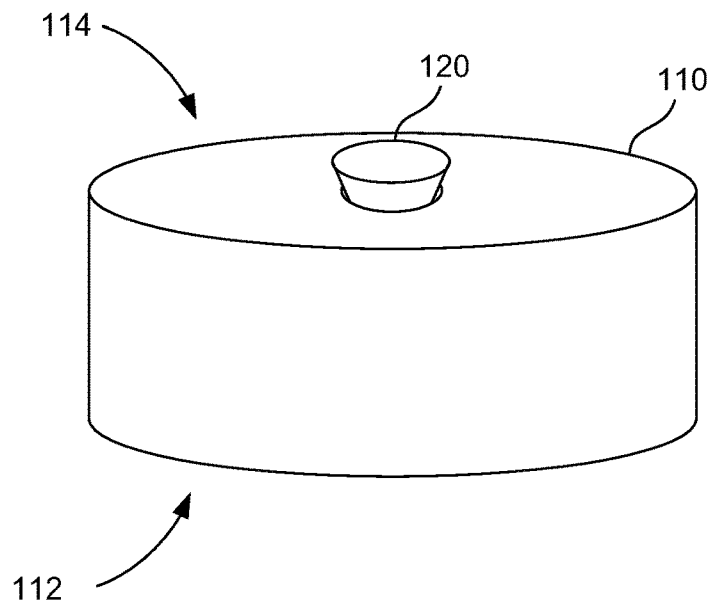
FIGS. 1A-1E are diagrams of a disc and a wedge that attach to a shaft for transmitting torque, according to one example of the principles described herein.

Shafts are used in many modern devices to transmit rotational force through (or in) the device. A disc, such as a gear, may be attached to the shaft. Torque applied to the gear causes the attached shaft to rotate. As another example, torque applied to the shaft causes the gear to rotate. Multiple discs may interact with one another to transfer torque from one shaft to other shafts. For example, in a printing system, the rotation of a shaft may feed paper through a printer. In another example, shafts and gears within a printing system provide rotational motion to different components within the printing system. That same shaft, or another shaft may also provide rotational motion to different components within the system, for example through another gear at another location on the shaft.

In some applications, currently used shafts and gears may prove ineffective. For example, when joining a gear to a shaft, the gear may be press fit onto the shaft. However, a simple press fit may not reliably affix the gear to the shaft. For example, too much transmitted torque may make the press fit gear slip on the shaft. This is exacerbated when the gear is plastic and the shaft is metal as plastic is subject to greater thermal expansion than metal and in a hot environment the plastic gear may lose its press and slip torsionally. Still further, plastic is susceptible to permanent stretch when under stress and a press fit places high stress on the plastic. This permanent stretch, or creep, accumulates over time until the press fit is no longer effective. The loss of the press fit as described above effects the life of the product. For example, the creep and loss of press fit can affect the operating life of a printer in which the shaft and gear are used.

Still further in some cases, a gear is attached to the shaft using an irregularity in the shape of the shaft. For example, the irregularity in the shape of the shaft may be a flattened side. The gear has a corresponding irregularity allowing the gear to fit on the shaft. By aligning the irregularity in the shaft with the irregularity in the gear, the likelihood of slippage is reduced. However, forming an irregularity in the shaft and gear complicate the respective manufacturing. For example, the shaft may be hollow with a thin wall, which reduces design options regarding the irregularity. Moreover, non-symmetric irregularities in a molded gear can affect the roundness of the gear, thereby complicating the manufacturing of the gear. Further, the assembly of the shaft and disc with irregularities is more difficult due to the need to align the irregularities.

In still another example, a retainer is fastened to a gear to secure the gear to the shaft. The retainer may be a metal clip, a set screw, or other device to secure the disc to the shaft. However, a retainer may add additional space and size to the disc assembly and may add to the complexity of fabrication.

The present specification describes an apparatus and method that addresses these and other complications. More specifically, the present specification describes an apparatus that includes a disc, such as a gear. The disc aligns with the shaft as will be described below and has a portion that is inserted into the shaft. The disc has a recess along the longitudinal axis to receive a wedge. When the wedge is inserted into the recess, the wedge 1) presses an inner hub of the disc against an inner diameter of the shaft or 2) presses an outside diameter of the disc against the inner diameter of the shaft, thus affixing the disc to the shaft. In other words, the apparatus uses the space inside the shaft to secure the disc to the shaft as the wedge pushes walls (i.e., either an inner hub or outside diameter) of the disc against the walls of the shaft.

In some examples, the disc may be constructed of a material, such as plastic, that expands when heated. The shaft may be constructed of a different material that expands at a different rate. For example, the shaft may be constructed of metal which has a slower expansion rate. When the disc expands, the disc exerts increased pressure on the inside wall of the shaft. The increased pressure exerted by the disc increases the amount of torque that can be applied to the disc without the disc slipping. In some examples, when the disc cools and the material of the disc contracts, an outer wall of a groove on the disc presses against an outer diameter of the shaft to further secure the disc to the shaft.

The present disclosure describes an apparatus that attaches to a shaft to transmit torque. The apparatus includes a disc having a longitudinal axis. At least a portion of the disc is insertable into the shaft. The disc includes a recess along the longitudinal axis. A wedge inserted into the recess is to push the portion of the disc inside the shaft outward against an inside diameter of the shaft.

The present disclosure describes a method for assembling a gear and shaft for axial rotation. According to the method, a disc is positioned relative to a shaft such that at least a portion of the disc is on an inside of the shaft. The disc includes a recess along a longitudinal axis. According to the method, a wedge is driven into the recess to push the portion of the disc on the inside of the shaft against an inner diameter of the shaft.

The present disclosure describes an apparatus that attaches to a shaft to transmit torque. The apparatus includes a shaft having a longitudinal axis. The apparatus includes a gear having a longitudinal axis. The gear includes a first side facing the shaft. The first side has a groove centered around the longitudinal axis of the gear. The groove receives the shaft and forms an inner hub of the gear. The gear includes a second side facing away from the hollow shaft. The second side of the gear has a portion defining a recess at the longitudinal axis. The apparatus includes a wedge that is inserted into the recess. The wedge presses an outer diameter of the inner hub of the gear against an inside diameter of the shaft.

The apparatus as described in the present specification allows for the transmission of torque between the shaft and disc that uses less space while still providing adequate resistance to disc slippage. By occupying less space, an apparatus of the present specification may be placed in a smaller device than an apparatus using a different mounting. Moreover the disc and wedge system described herein is inexpensive as it does not rely on complex and additional manufacturing of the shaft nor is there any complex alignment during installation. Moreover the disc and wedge system described herein prevent the disc from loosening when a temperature change causes a change in disc and shaft sizes. The system also prevents the disc from loosening if after time, the loads on the disc cause it to creep.

As used in the present specification and in the appended claims, the term "hub" refers to a central part of a disc that is co-axial with a longitudinal axis of the disc.

Yet further, as used in the present specification and in the appended claims, the term "a number of" or similar language may include any positive number including one to infinity; zero not being a number, but the absence of a number.

In the following description, for purposes of explanation, numerous specific details are set forth in order to provide a thorough understanding of the present systems and methods. The present apparatus, systems, and methods may be practiced without these specific details. Reference in the specification to "an example" or similar language means that a particular feature, structure, or characteristic described in connection with that example is included as described, but may not be included in other examples.

Figure 1B:
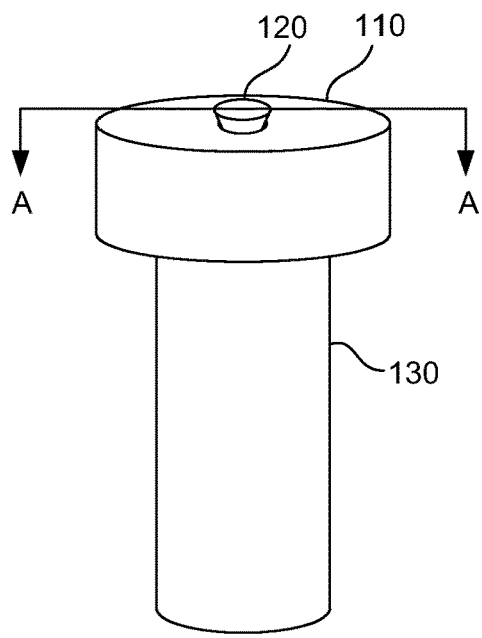
Figure 1C:
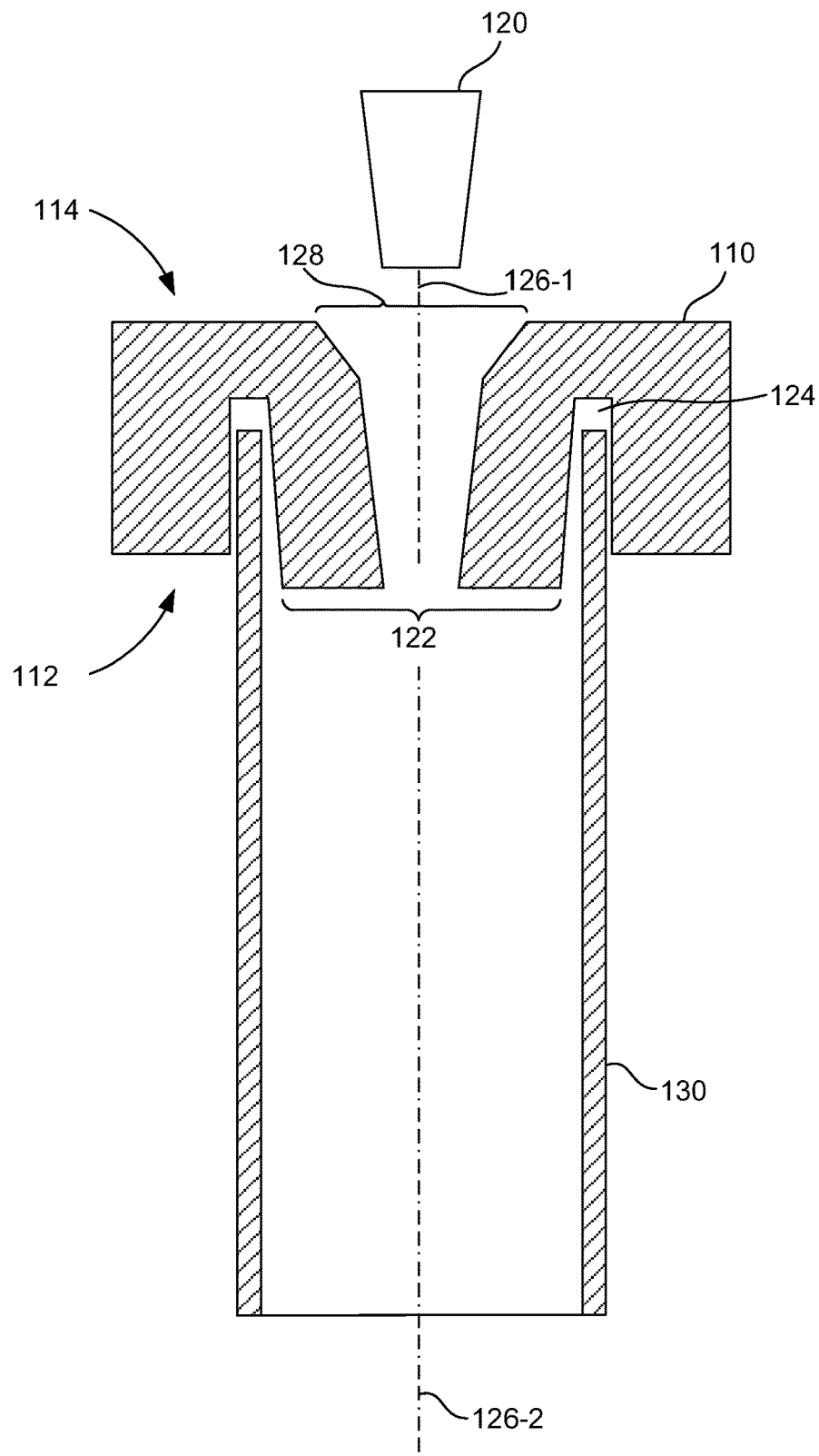
Figure 1D:
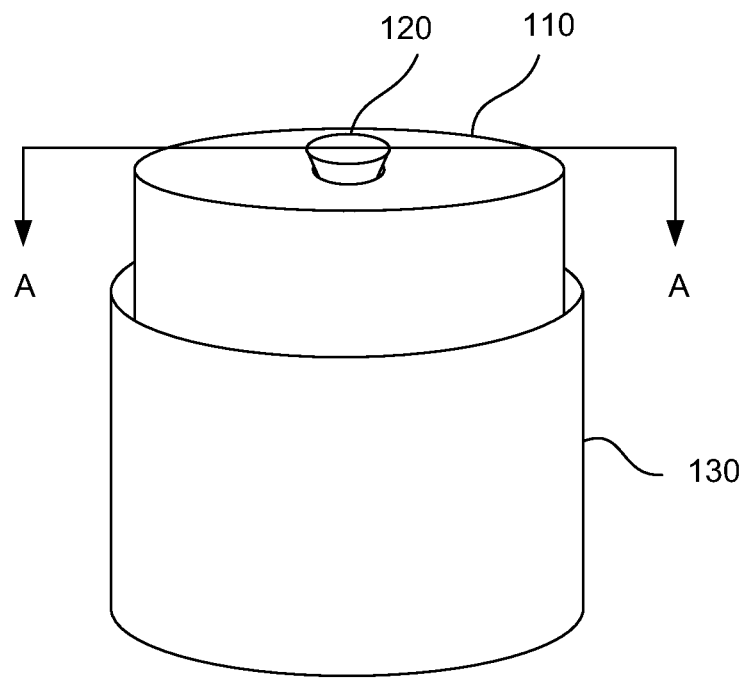
Figure 1E:
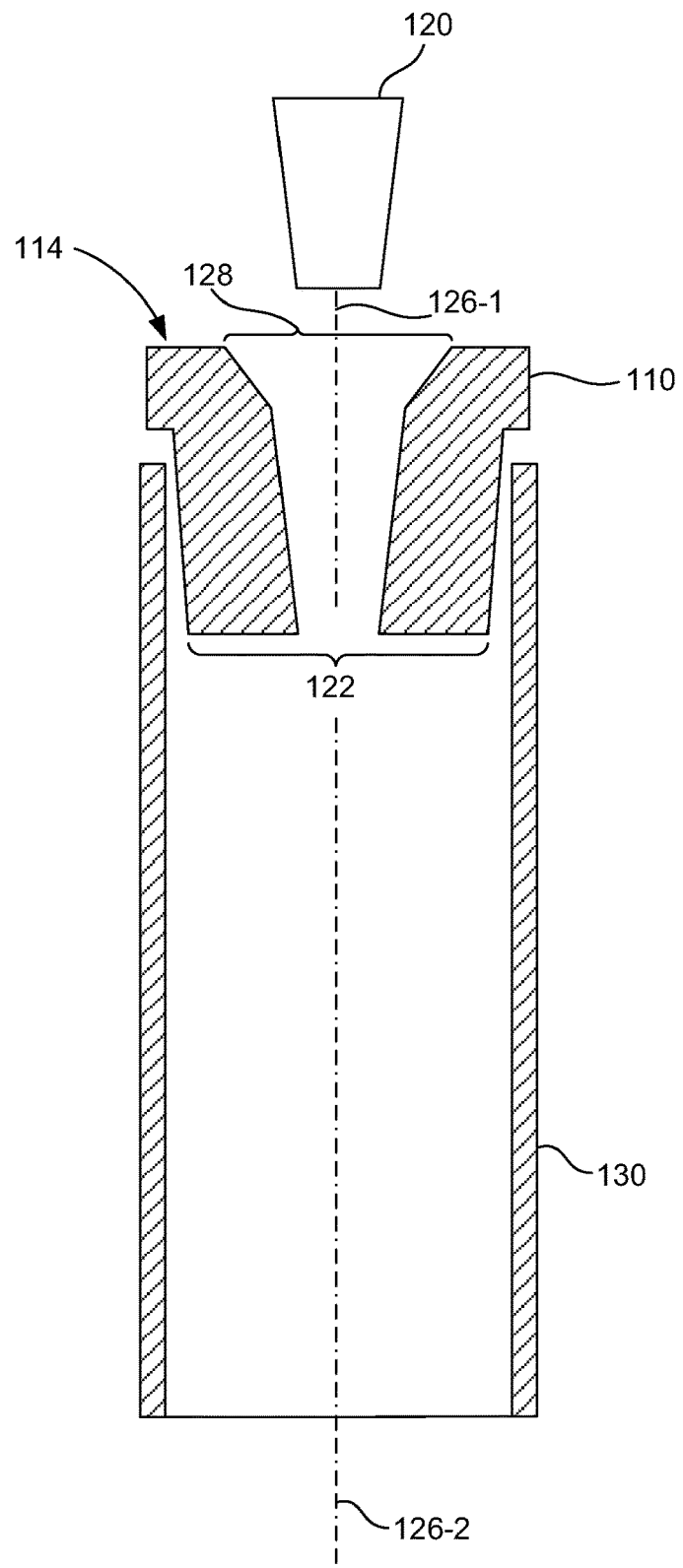

FIGS. 1A-1E are diagrams of a disc (110) and a wedge (120) that attach to a shaft (130) for transmitting torque, according to one example of the principles described herein. As mentioned above, at least a portion of the disc (110) is insertable into the shaft (130). For example, an outside diameter of the disc (110) may be greater than an outside diameter of the shaft (130). In this example, the disc (110) includes a groove (124) that defines an inner hub (122) as depicted in FIG. 1C. In this example, this inner hub (122) is the portion that is insertable into the shaft (130). This example is depicted in FIGS. 1B-1C. In another example, the diameter of the disc (110) may be less than the outside diameter of the shaft (130). In this example, the portion that is insertable into the shaft (130) is defined by the outside diameter of the disc (130) as depicted in FIG. 1E. This example is depicted in FIGS. 1D-1E. Specifically, FIG. 1A is a front view of the disc (110) and the wedge (120); FIG. 1B is a front view of the disc (110) and the wedge (120) engaging a shaft (130); and FIG. 1C is a cross-sectional view taken along the line A in FIG. 1B. The wedge (120) secures the disc (110) to the shaft (130). When torque is applied to the disc (110), the disc (110) turns the shaft (130).

The shaft (130) transfers torque from the disc (110) to other parts of the device, or gears of the device, that may be attached to the shaft (130). In another example, the disc (110) transfers torque from the shaft (130) to other parts of the device, or gears of the device, that may be attached to the disc (110).

Figure 7A:
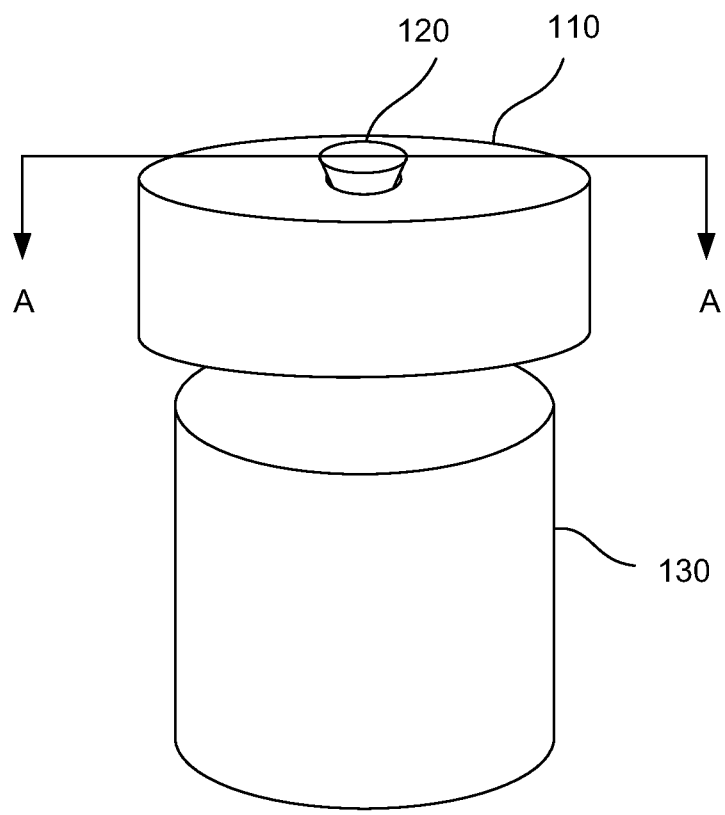
FIGS. 7A and 7B are diagrams of a disc that attaches to a solid shaft for transmitting torque, according to one example of the principles described herein.
Figure 7B:
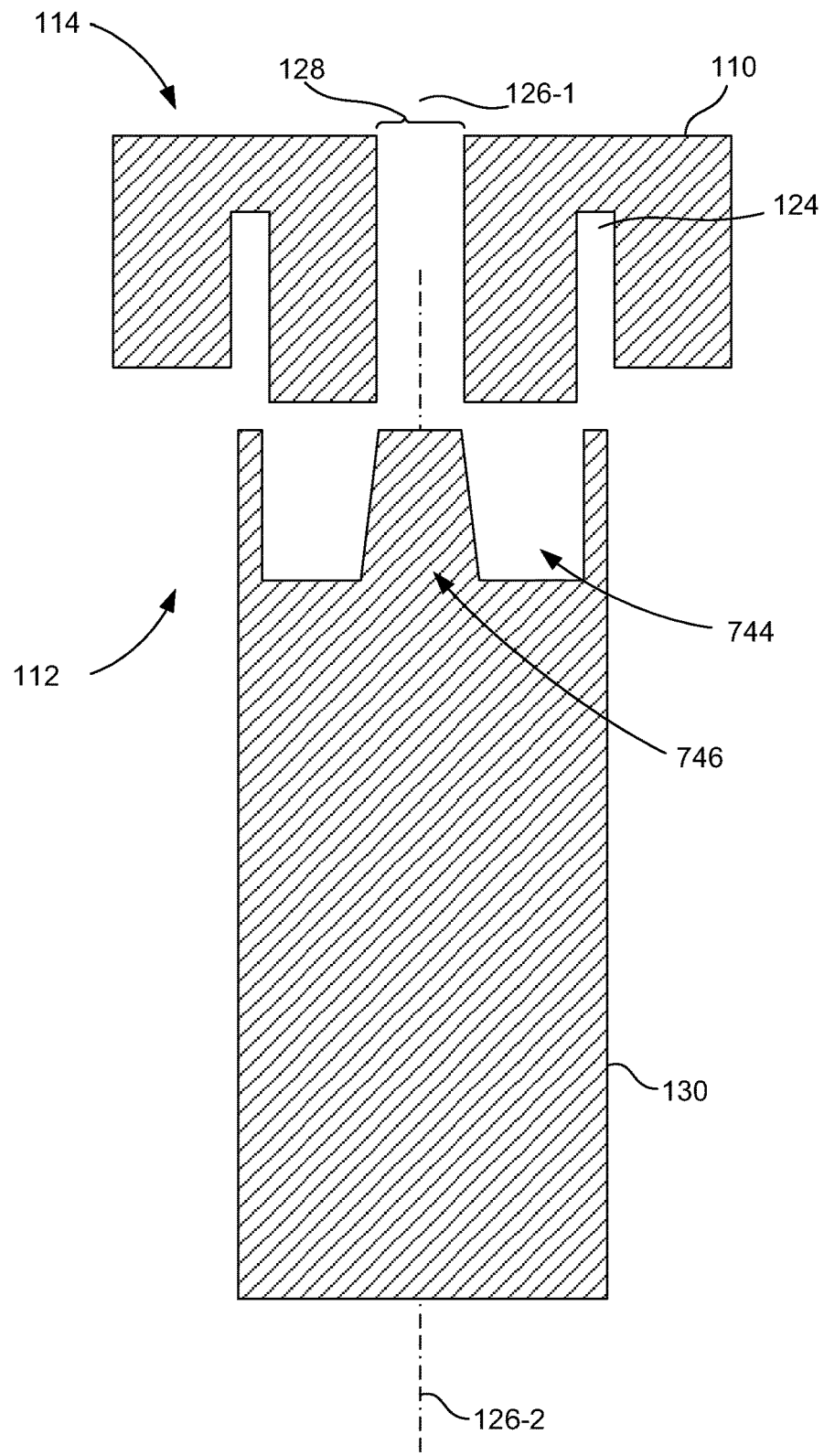

In some examples, as depicted in FIGS. 1A-1E the shaft (130) is hollow. In other examples, as depicted in FIGS. 7A-7B the shaft is solid. A brief description of the formation of the shaft (130) will now be described. The shaft (130) may be formed of a metallic material. The shaft (130) may be formed while the material is pliable. For example, the shaft (130) may be formed from molten metal. As a specific example, the metal may be heated and formed into the shape of the shaft (130). Other methods may be used to form the shaft (130). For example, a hollow shaft (130) may be formed by bending a piece of material into a cylinder, welding the seam, and then grinding the seam to make a smooth surface. The shaft (130) may then be processed to smooth the outer diameter. In some examples, the shaft (130) may have a portion of the shaft that is hollow, while the remainder of the shaft is solid. Specifically, the end of the shaft (130) where the disc (110) is secured may be hollow while the rest of the shaft (130) is solid. The shaft (130) may be formed by machining, drilling, or grinding the end of the shaft to be hollow to allow for the disc (110) to be secured.

The disc (110) is a component that is mounted on the end of the shaft (130) to transfer torque to/from the shaft (130). In some examples the disc (110) is a gear that has a number of teeth to interact with a different gear to provide torque to the shaft (130) or to distribute torque from the shaft (130) to another gear. In one example, the disc (110) may be constructed of the same material as the shaft (130). In another example, the disc (110) may be constructed of a different material than the shaft (130). The disc (110) includes a first side (112) facing toward the shaft (130) and a second side (114) facing away from the shaft (130).

A portion of the disc is insertable into the shaft (130) as depicted in FIGS. 1C and 1E. For example, the diameter of the disc (110) may be larger than the diameter of the shaft (130) as depicted in FIG. 1B. In this example, the first side (112) facing toward the shaft (130) has a groove (124) to receive the shaft (130) as depicted in FIG. 1C. This groove (124) defines an inner hub (122) that is a portion of the disc (110) that is insertable into the shaft (130).

By comparison, in other examples the diameter of the disc (110) is smaller than the diameter of the shaft (130) as depicted in FIG. 1D. In this example, the portion that is insertable into the shaft (130) is defined by the outside diameter of the disc (110) as indicated in FIG. 1E. In the example where the outside diameter of the disc (110) is smaller than the outside diameter of the shaft (130), the disc (110) may be inserted into the shaft (130) using a light press fit to maintain concentricity of the shaft (130) and the disc (110).

In both examples, (i.e., those depicted in all of FIGS. 1A-1E) a second side (114) facing away from the shaft (130) includes a recess (128) to receive the wedge (120). The wedge (120) is inserted into the recess (128) and causes a portion that is inside the shaft (130) to press outward against the shaft (130) to secure the disc (110) to the shaft (130). In some examples, the recess (128), the wedge (120) or both are tapered. The recess (128) may protrude through the disc (110), making an opening in the first side (112). The recess (128) is formed around a longitudinal axis (126-1) of the disc (110). When the disc (110) is secured to the shaft (130), the longitudinal axis (126-1) of the disc (110) may align with a longitudinal axis (126-2) of the shaft (130). Aligning the longitudinal axes (126-1, 126-2) may allow the shaft (130) and the disc (110) to rotate smoothly.

The disc (110) and/or shaft (130) may be used to drive another component of the device that includes the disc (110) and other component. For example, via a belt disposed around the circumference of the disc (110) or teeth on a gear disc (110), other components may be driven or paper may be feed through a printer. For example, the outer edge of the disc (110) may receive a belt to provide rotational energy to the different component. The outer edge of the disc (110) may have surface features, such as a groove, to guide a belt or provide additional friction. In another example, the outer edge of the disc (110) may be coated with rubber to provide adhesion to feed material through a device. For example, a disc (110) with the outer edge coated in rubber may be used to move paper through a printer. A number of discs (110) may have direct contact to transfer rotational energy.

In another example, for example as depicted in later figures, the outer edge may include teeth such that the disc (110) is a gear. The teeth of the gear may engage with teeth of another gear to transfer rotational force throughout the device.

As indicated in FIG. 1C and others, the disc (110) includes a first side (112) and a second side (114). The first side (112) faces the shaft (130). In one example, the first side (112) forms a groove (124) to receive the shaft (130). The groove (124) defines an inner hub (122) that is inserted into the shaft (130). The groove (124) causes the disc (110) to be positioned relative to the shaft (130). Specifically, the groove aligns a longitudinal axis (126-1) of the disc (110) with a longitudinal axis (126-2) of the shaft (130). The groove (124) does not protrude through the disc (110), preventing movement of the disc (110) longitudinally relative to the shaft (130). This ensures that the disc (110) does not slip off the shaft (130). The inner hub (122) presses against an inner diameter of the shaft (130) when a wedge (120) is inserted into a recess (128) in the disc (110). The inner hub (122) may have a number of sections that press against the inner diameter of the shaft (130).

The groove (124) in the first side (112) also has an outer wall. The outer wall of the groove (124) fits on the outside diameter of the shaft (130). In one example, the disc (110) is press fit such that the outer wall of the groove (124) exerts inward pressure against the outer diameter of the shaft (130). This press fit presses plastic or similar material together to secure the disc (110) to the outer diameter of the shaft (110). In another example, the disc (11) is not press fit to the shaft (130). In other words, the outer wall of the groove (124) is not pressed against the outer diameter of the shaft (130). In other words, the outer wall of the groove (124) may contact the shaft (130) without a press fit. In this example, the groove (124) serves as a guide to receive the shaft (130), ensuring concentricity between the shaft (130) and the disc (110). Press fitting the disc (110) onto the shaft (130) such that the outer wall exerts inward pressure against the shaft (130) also provides additional resistance to disc slippage.

As depicted in FIG. 1C, a wedge (120) may be pressed into the recess (128) to expand the inner hub (122) to press the inner hub (122) against the inner diameter of the shaft (130). The wedge (120) may be shaped to provide friction that prevents the wedge (120) from being forced out of the recess (128). In one example, the wedge (120) includes a spiral thread, like a screw. In another example, the wedge (120) includes a number of notches. When the wedge (120) is pushed into the recess (128), the material that forms the disc (110) expands into the notches, preventing the wedge (120) from being forced out of the recess (128). In some examples, the shaft (130) and the wedge (120) are constructed of metal. By comparison, the disc (110) is constructed out of a plastic or polymer.

In this example, the groove (124) of the disc (110) receives the shaft (130). The outer wall of the disc (110) touches, but does not secure against, the outer diameter of the shaft (130). The outer diameter of the inner hub (122) touches, but does not press against, the inner diameter of the shaft (130). The wedge (120) is pressed into the recess (128). The pressure against the wedge (120) causes the inner hub (122) to expand and press against the inner diameter of the shaft (130). In other words, the material (122) of the inner hub (122) may plastically deform, but the walls of the inner hub (122) also flex outward. A split can provide space for displaced plastic to squeeze outward, and may make it easier to drive the screw in during assembly.

In another example as depicted in FIG. 1D, the disc (110) may have a smaller diameter than the shaft (130). In this example, the portion of the disc that is insertable into the shaft (130) is defined by an outside diameter of the disc (110) as indicated in FIG. 1E. In this example a wedge (120) may be pressed into the recess (128) to expand the outside diameter to press the outside diameter of the disc (110) against the inner diameter of the shaft (130).

In this example, the shaft (130) receives the disc (110). The disc (110) may be inserted into the shaft (130) with a light press fit to improve concentricity of the shaft (130) and the disc (130).

Figure 2:
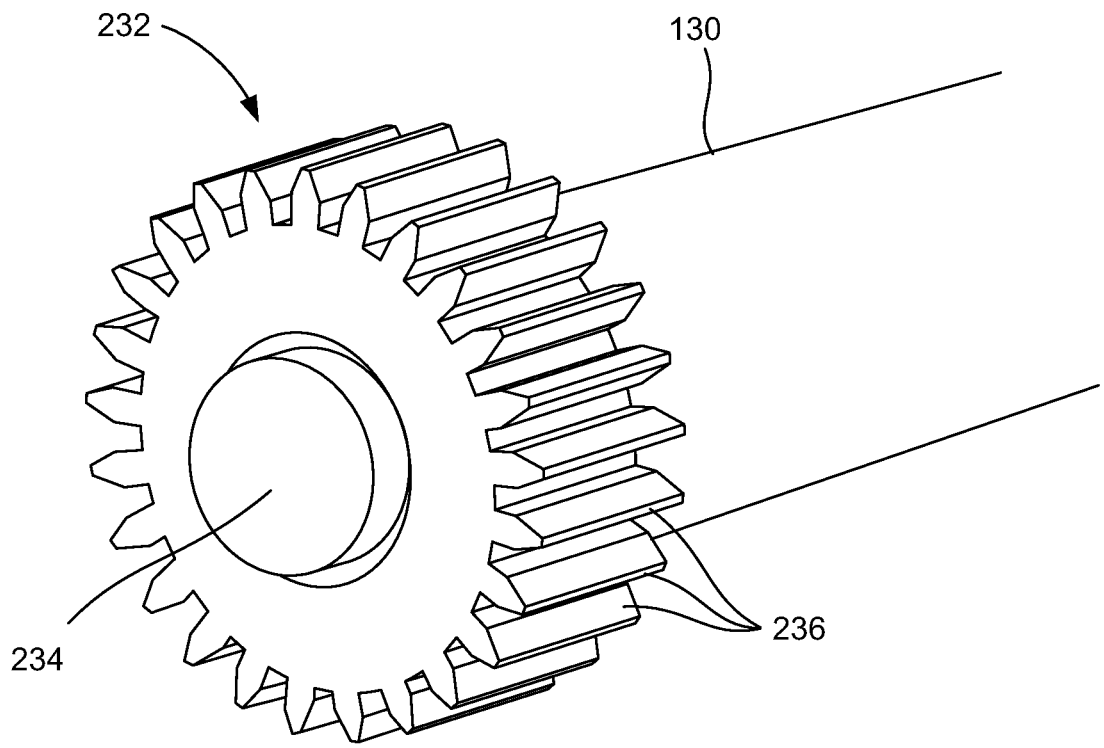
FIG. 2 is a diagram of a gear and a screw that attach to a shaft for transmitting torque according to one example of the principles described herein.

FIG. 2 is a diagram of a gear (232) and a screw (234) for attaching to a shaft (130) according to one example of the principles described herein. As depicted in FIG. 2 and as described above, in some examples, the disc (FIG. 1, 110) may be a gear (232) that includes a number of teeth (236). The number of teeth (236) may enmesh with teeth of another gear so as to transfer rotational energy to or from the hollow shaft (130).

The screw (234) is an example of a wedge (FIG. 1, 120) that is inserted into the recess on the second side (FIG. 1, 114) facing away from the shaft (130). The screw (234) includes a spiral ridge or groove that forms a thread. As the screw (234) is rotated, the thread contacts the recess and draws the screw (234) into the recess (FIG. 1, 128). As the screw (234) is drawn into the recess (FIG. 1, 128), the screw (234) expands the inner hub (FIG. 1, 122) or outside diameter of the gear (232) to press against the inside diameter of the hollow shaft (130). The pressure of the inner hub (FIG. 1, 122) or outside diameter of the gear (232) against the inside diameter of the shaft (130) secures the gear (232) to provide sufficient torque to/from the shaft (130) and also provides resistance against torque that would otherwise cause disc slippage.

The threads on the screw (234) may create additional pressure on a threaded area of the gear (232). The threaded area may expand both due to the pressure of the screw (234), and from the pressure of the threads on the screw (234). The displacement of the threaded area of the gear (232) both causes the inner hub (FIG. 1, 122) to expand, pressing against the inner diameter of the hollow shaft (FIG. 1, 130) and prevents the screw (234) from being pressed and pushed out of the recess (FIG. 1, 128).

Figure 3:
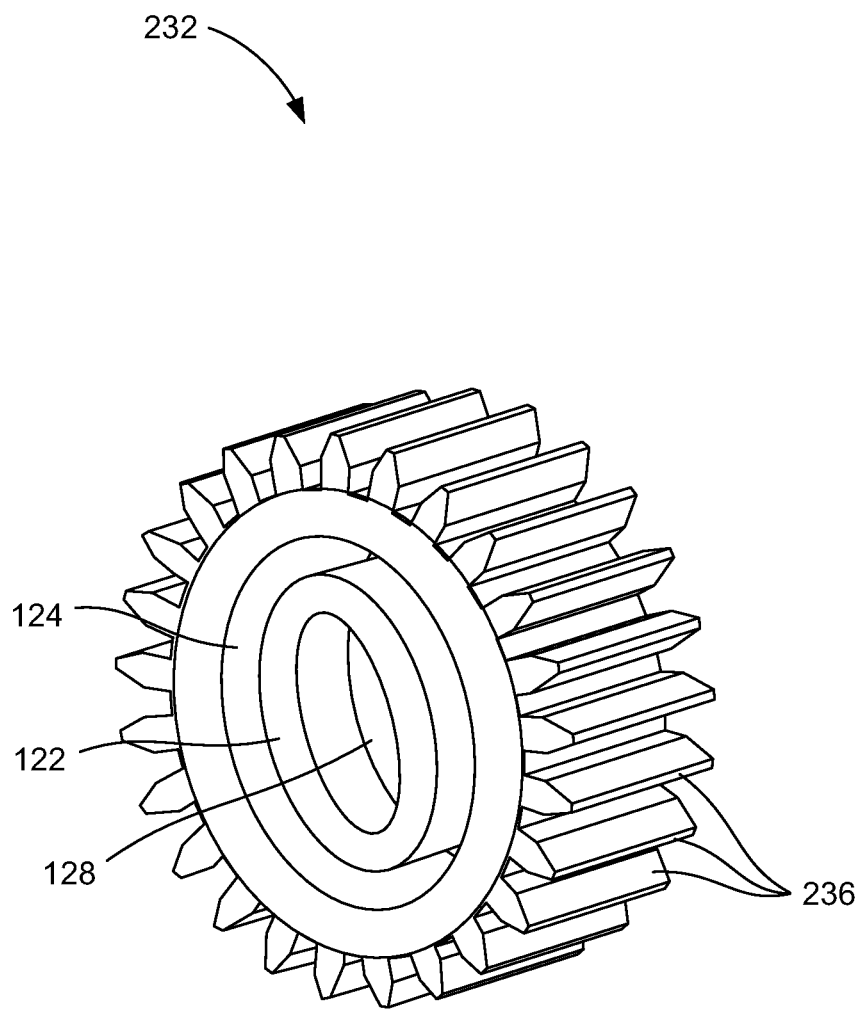
FIG. 3 is a diagram of a first side of a gear that attach to a shaft for transmitting torque according to one example of the principles described herein.

FIG. 3 is a diagram of a first side (FIG. 1, 112) of the gear (232) that attaches to a shaft (FIG. 1, 130) for transmitting torque, according to one example of the principles described herein. Specifically, FIG. 3 depicts a scenario where the gear (232) has a larger diameter than the shaft (FIG. 1, 130). In this example, the first side (FIG. 1, 112) of the gear (232) has a groove (124) that receives the shaft (FIG. 1, 130) and faces the shaft (FIG. 1, 130) when the apparatus is assembled, for example in a printer. The groove (124) defines the inner hub (122). The inner hub (122) has an outer diameter that presses against the inner diameter of the shaft (FIG. 1, 130) when a wedge (FIG. 1, 120) such as a screw (FIG. 2, 234) is inserted into a recess (128). In some examples, a bottom of the groove (124) includes a number of ribs that form collection cavities for collecting debris. More detail regarding the collection cavity and associated ribs is provided below in connection with FIG. 8. As described above, the gear (232) includes a number of teeth (236) to interact with a number of teeth on a different gear to transfer rotational energy between the gears.

When the gear (232) receives the shaft (FIG. 1, 130), the groove (124) may fit snugly against the shaft (FIG. 1, 130). In other words, the outer wall of the groove (124) may have continuous contact with the outer diameter of the shaft (FIG. 1, 130) and the outer diameter of the inner hub (122) may have continuous contact against the inner diameter of the shaft (FIG. 1, 130).

In one example, the gear (FIG. 2, 232) is press fit onto the shaft (FIG. 1, 130). The combination of the gear (FIG. 2, 232) being press fit to the outer diameter of the shaft (FIG. 1, 130) and the outer diameter of the inner hub (FIG. 1, 122) pressing against the inner diameter of the shaft (FIG. 1, 130) secures the gear (FIG. 2, 232) to the shaft (FIG. 1, 130).

In one example, the gear (FIG. 2, 232) is not press fit onto the shaft (FIG. 1, 130). Instead, the outer wall of the groove (124) contacts, but does not press, against an outer diameter of the shaft (FIG. 1, 130). Similarly, the outer diameter of the inner hub (122) contacts, but does not press against, the inner diameter of the shaft (FIG. 1, 130). When a screw (FIG. 2, 234) or wedge (FIG. 1, 120) is inserted into the recess (FIG. 1, 128), the outer diameter of the inner hub (122) expands to contact with the inner diameter of the shaft (FIG. 1, 130). The expansion of the outer diameter (338) of the inner hub (122) creates pressure against the inner diameter of the shaft (FIG. 1, 130) that holds the gear (232) in place.

Figure 4:
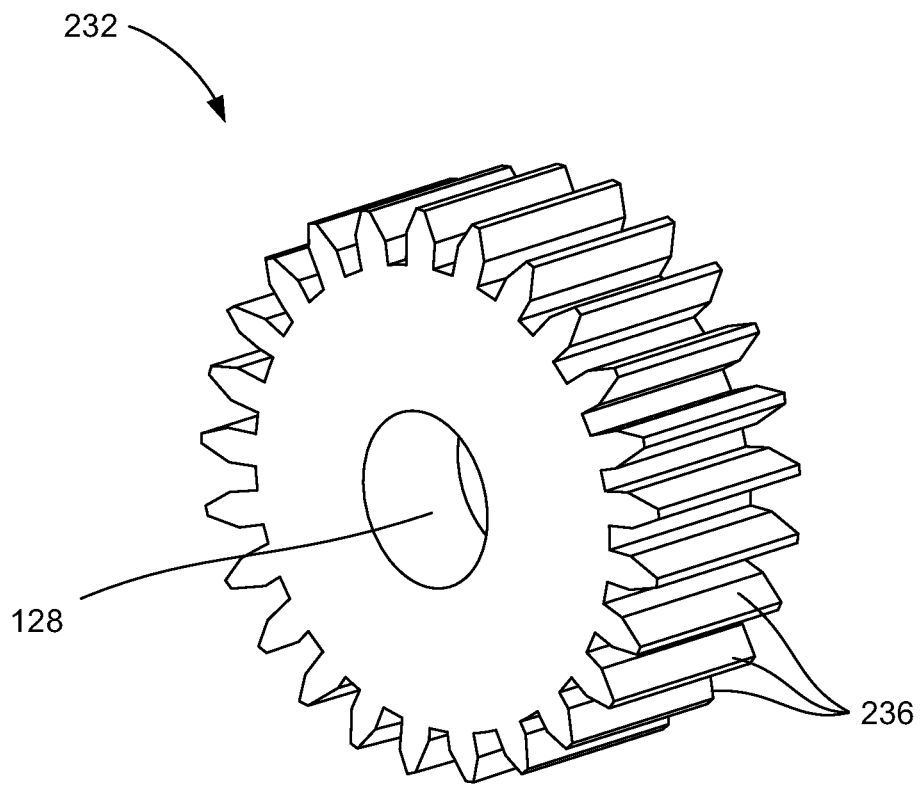
FIG. 4 is a diagram of a second side of a gear that attaches to a shaft for transmitting torque according to one example of the principles described herein.

FIG. 4 is a diagram of a second side (FIG. 1, 114) of a gear (232) that attaches to a shaft (FIG. 1, 130) for transmitting torque, according to one example of the principles described herein. The second side (FIG. 1, 114) of the gear (232) faces away from the shaft (FIG. 1, 130). The gear (232) includes a number of teeth (236) to interact with teeth on other gears to transfer rotational motion. The second side (FIG. 1, 114) also defines a recess (128). The recess (128) receives the wedge (FIG. 1, 120) or the screw (FIG. 2, 234). In some examples, the recess (128) may have a tapered cross section towards the first side (FIG. 1, 112). In other examples, the recess (128) side walls may be straight.

In one example, the wedge (FIG. 1, 120) is driven into the recess (128) using pressure. The pressure may be direct constant pressure, or may be intermittent pressure from a device such as a hammer. The shape of the wedge (FIG. 1, 120) causes the inner hub (FIG. 1, 122) or outside diameter of the gear (232) to expand and press the outer diameter of the gear (232) against the inner diameter of the shaft (FIG. 1, 130). For example, the wedge (FIG. 1,120) may be tapered such that a distal portion of the wedge (FIG. 1, 120), i.e., the part initially inserted into the recess (128), is narrower than a proximal portion of the wedge (FIG. 1, 120), i.e., the part that is last inserted into the recess (128). Accordingly, as the wedge (FIG. 1, 120) enters the recess (128), the increasing diameter of the wedge (FIG. 1, 120) causes the inner hub (FIG. 1, 122) or outside diameter of the gear (232) to expand and press the outer diameter of the inner hub (FIG. 1, 122) against the inner diameter of the shaft (FIG. 1, 130).

In another example, a screw (FIG. 2, 234) is inserted into the recess (128). The screw (FIG. 2, 234) is rotated so that threads on the screw (FIG. 2, 234) draw the screw (FIG. 2, 234) into the recess (128). As the screw (FIG. 2, 234) is drawn into the recess (128), the screw (FIG. 2, 234) displaces a portion of the material that comprises the inner hub (FIG. 1, 122) our outside diameter of the gear (232). As the material that comprises the inner hub (FIG. 1, 122) or outside diameter is displaced, the inner hub (FIG. 1, 122) or outside diameter expands. As the inner hub (FIG. 1, 122) or outside diameter expands, the outer diameter presses against the inner diameter of the shaft (FIG. 1, 130). The pressure of the outer diameter or the inner hub (FIG. 1, 122) against the inner diameter of the shaft (FIG. 1, 130) prevents the disc (FIG. 1, 110) from slipping while torque is applied to the disc (FIG. 1, 110).

Figure 5:
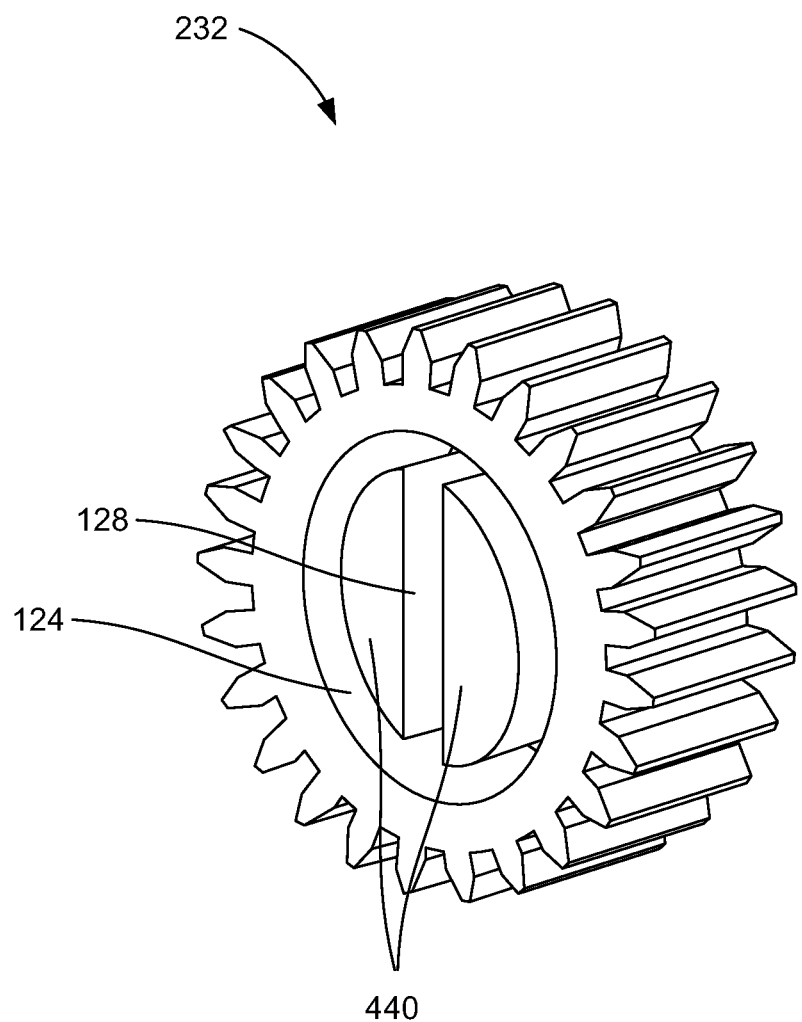
FIG. 5 is a diagram of a first side of a gear with a divided inner hub according to one example of the principles described herein.

FIG. 5 is a diagram of a first side (FIG. 1, 112) of a gear (232) with a divided inner hub (440) according to one example of the principles described herein. A divided inner hub (440) may allow for a larger wedge (FIG. 1, 120) to expand the divided inner hub (440) against the inner diameter of the shaft (FIG. 1, 130) by allowing greater expansion of the divided inner hub (440) without breaking the divided inner hub (440). Moreover, the divided hub (440) may allow for greater exertion of pressure of the outer diameter of the divided inner hub (440) against the inner diameter of the shaft (FIG. 1, 130). In this example, the recess (128) formed on the second side (FIG. 1, 114) extends to create an opening in the divided inner hub (440).

The groove (124) defines an outer edge of a divided inner hub (440) as part of the gear (232). The divided inner hub (440) may be divided into a plurality of sections. Each section may be created by dividing an inner hub (FIG. 1, 122) across a diameter. When a screw (FIG. 2, 234) or wedge (FIG. 1, 120) is inserted into the recess (128), the screw (FIG. 2, 234) or wedge (FIG. 1, 120) causes each of the plurality of sections of the divided inner hub (440) to press against the inner diameter of the shaft (FIG. 1, 130). Dividing an inner hub (440) may prevent the inner hub (440) or the gear (232) from breaking when a screw (FIG. 2, 234) or wedge (FIG. 1, 120) is inserted into the recess (128). The divided inner hub (440) may also allow room for the hub material to flow if it is plastically deformed during assembly. The divided inner hub (440) may also ease insertion of the wedge (FIG. 1, 120).

Figure 6:
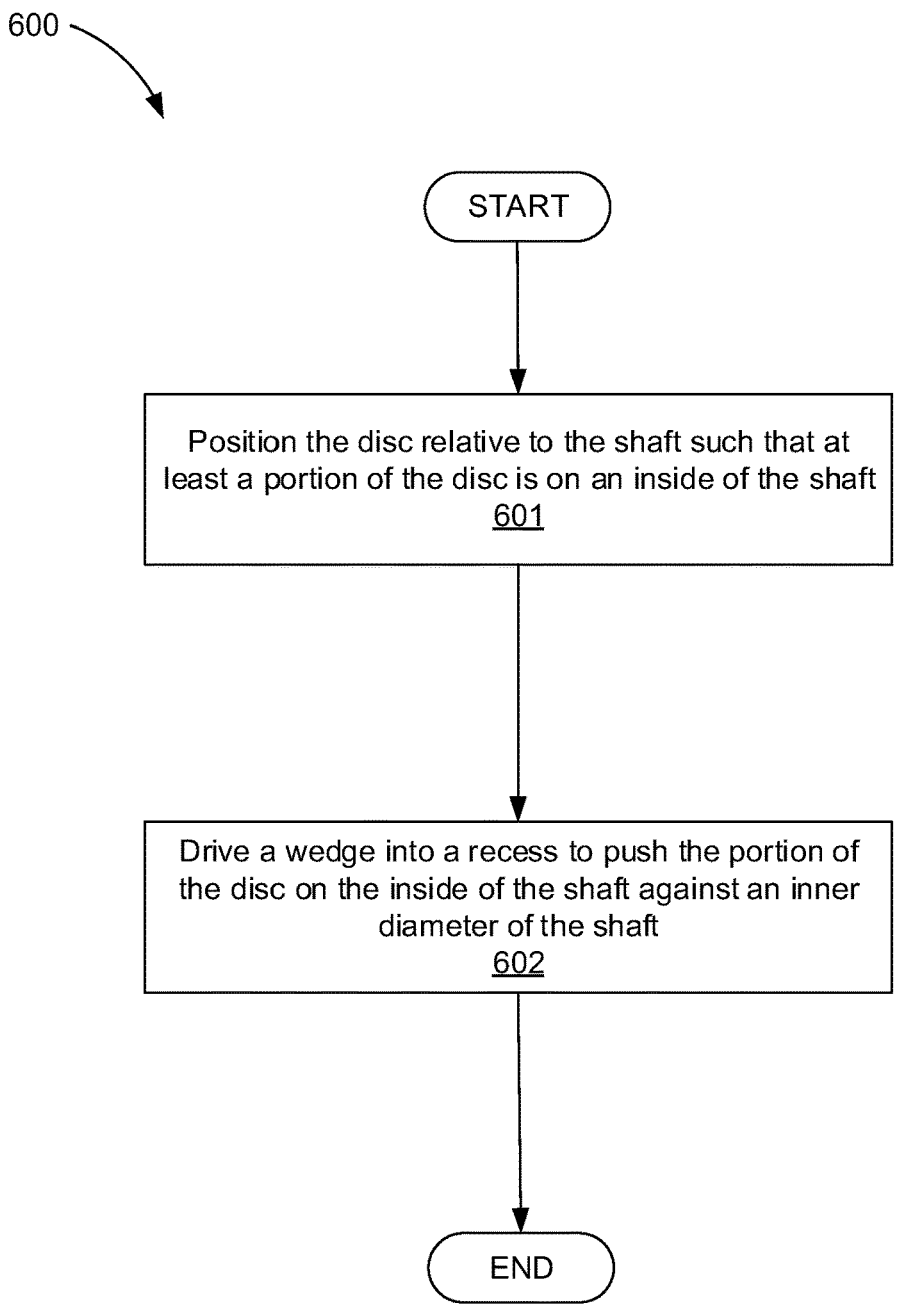
FIG. 6 is a flow chart of a method for attaching a disc and wedge to a shaft, according to one example of the principles described herein.

FIG. 6 is a flow chart of a method (600) for attaching a disc (FIG. 1, 110) and wedge (FIG. 1, 120) to a shaft (FIG. 1, 130) according to one example of the principles described herein. The method (600) includes positioning (block 601) a disc (FIG. 1, 110) relative to a shaft (FIG. 1, 130) such that at least a portion of the disc (FIG. 1, 110) is on an inside of the shaft (FIG. 1, 130). For example, when the outside diameter of the disc (FIG. 1, 110) is larger than the shaft (FIG. 1, 130), the shaft (FIG. 1, 130) is inserted into a groove (FIG. 1, 124) on a disc (FIG. 1, 110). The groove (FIG. 1, 124) defines an inner hub (FIG. 1, 122) that is the portion that is inserted into the shaft (FIG. 1, 130).

In another example where the disc (FIG. 1, 110) outside diameter is less than the outside diameter of the shaft (FIG. 1, 130), the portion of the disc (FIG. 1, 110) that is insertable into the shaft (FIG. 1, 130) is defined by the outside diameter of the disc (FIG. 1, 100). In other words, positioning (block 601) the disc (FIG. 1, 110) includes inserting the disc (FIG. 1, 110) into the shaft (FIG. 1, 130).

The method (600) includes driving (block 602) a wedge (FIG. 1, 120) into the recess (FIG. 1, 128) at the longitudinal axis (FIG. 1, 126-1) on the second side (FIG. 1, 114) of the disc (FIG. 1, 110). When the wedge (FIG. 1, 120) is pressed in, the portion of the disc (FIG. 1, 110) that is inserted inside the shaft (FIG. 1, 130) (i.e., the inner hub (FIG. 1, 122) or a portion defined by the outside diameter of the disc (FIG. 1, 110)) expands to press against the inner diameter of the shaft (FIG. 1, 130). The wedge (FIG. 1, 120) may be a screw (FIG. 2, 234) that includes threads to draw the wedge (FIG. 1, 120) into the recess (FIG. 1, 128).

FIGS. 7A and 7B are diagrams of a disc (110) for attaching to a solid shaft, according to one example of the principles described herein. Specifically, FIG. 7A is a front view of the disc (110) and the wedge (120) engaging a shaft (130) and FIG. 7B is a cross-sectional view taken along the line A in FIG. 7A. The wedge (120) secures the disc (110) to the shaft (130). When torque is applied to the disc (110), the disc (110) turns the shaft (130). As described above and as depicted in FIG. 7B, the shaft (130) may be solid. In this example, an end of the shaft (130) that is to receive the disc (110) is bored to form a groove (744) on the shaft (130) that defines the wedge (746) that expands the inner hub (FIG. 1, 122) or outside diameter of the disc (110) against the inside diameter of the shaft (130). In other words, as depicted in FIGS. 1A-1E, the wedge (FIG. 1, 120) may be a separate component from the disc (110) and the shaft (13) and in other examples, as depicted in FIG. 7B, the wedge (746) may be integral to one of the components; the shaft (130) for example.

Figure 8:
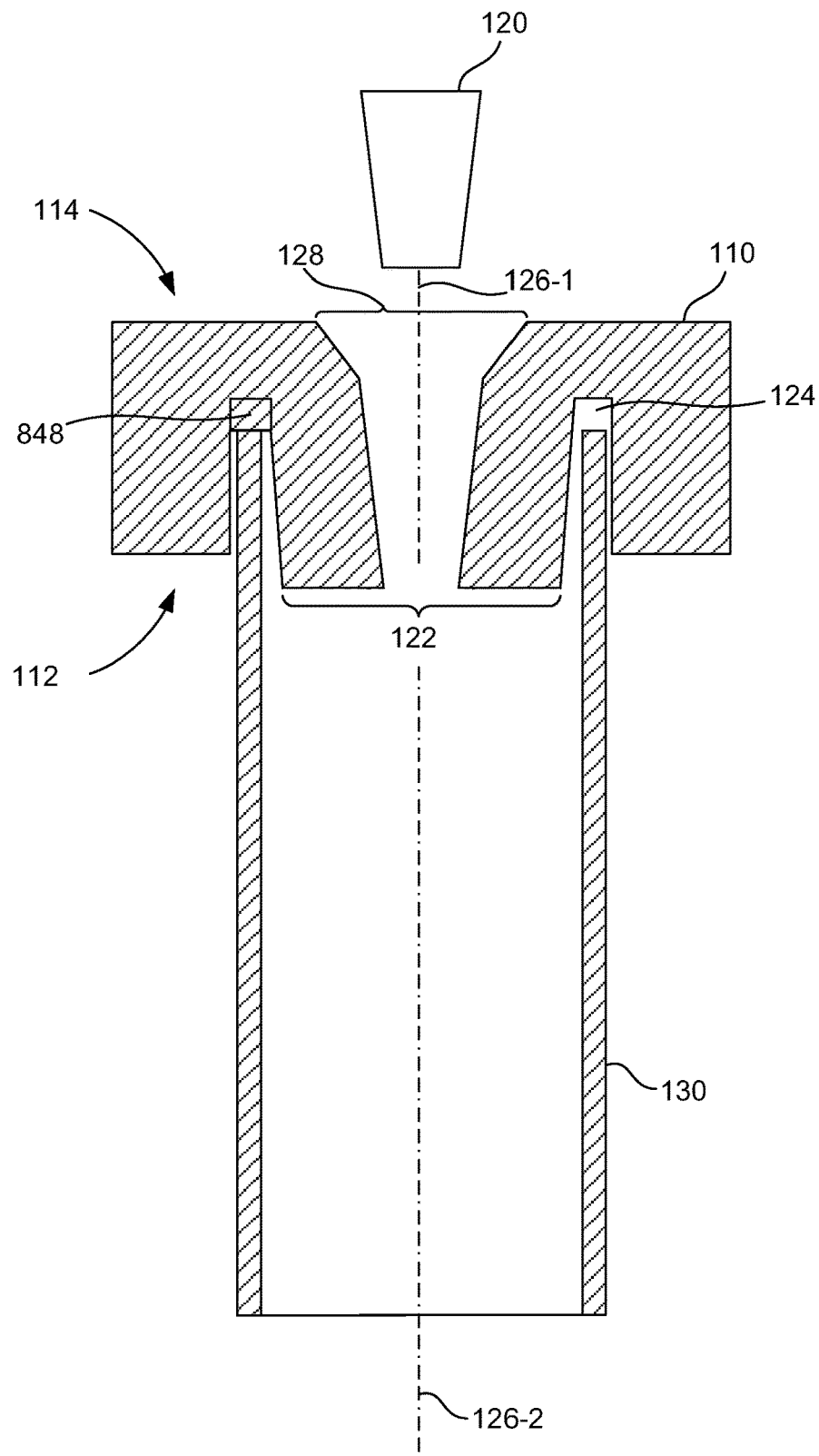
FIG. 8 is a cross-sectional diagram of a disc with a collection cavity, according to one example of the principles described herein.

FIG. 8 is a cross-sectional diagram of a disc (110) with a collection cavity, according to one example of the principles described herein. In some examples, the groove (124) may have a number of radially-distributed ribs (848) along the bottom portion of the groove (124). A cross section of one such rib (848) is indicated in FIG. 8. As can be seen in FIG. 8, the ribs (848) contact some portions of the shaft (130), i.e., the left hand portion in FIG. 8. Other portions of the shaft (130) are not in contract with a rib (848), thereby forming a cavity as depicted on the right hand portion in FIG. 8. In this cavity shavings or other debris is collected. For example, an irregularity may be created while forming a disc (110) from a plastic or polymer. The irregularity may be severed from the disc (110) as the shaft (130) is received. The severed irregularity may be pressed, by the shaft (130), into the collection cavity. The collection cavity holds the debris and prevents the debris from interfering with the alignment of the disc (110) on the shaft (130).

The preceding description has been presented to illustrate and describe examples of the principles described. This description is not intended to be exhaustive or to limit these principles to any precise form disclosed. Many modifications and variations are possible in light of the above teaching.

What is claimed is:

1. An apparatus comprising:
a disc having a longitudinal axis, wherein:
at least a portion of the disc is insertable into a shaft and is expandable against an inside diameter of the shaft;
the disc comprises a recess along the longitudinal axis;
a wedge to be inserted into the recess pushes the portion of the disc that is insertable into the shaft against an inside diameter of the shaft,
wherein the wedge comprises a number of notches and the disc comprises a material that expands into the notches as the wedge is inserted in the recess to retain the wedge in the recess.

2. The apparatus of claim 1, wherein the disc comprises:
a first side having a groove centered around the longitudinal axis of the disc; and
wherein:
the groove is to receive the shaft; and
the portion of the disc that is insertable into the shaft is an inner hub defined by the groove.

3. The apparatus of claim 2, wherein the inner hub is divided into a plurality of sections, each section being created by dividing the inner hub across a full diameter of the inner hub.

4. The apparatus of claim 2, wherein the groove forms a cavity to collect debris with a number of radially-distributed ribs along a bottom surface of the groove to create collection cavities that collect debris.

5. The apparatus of claim 1, wherein the portion of the disc that is insertable into the shaft is defined by an outside diameter of the disc.

6. The apparatus of claim 1, wherein the disc further comprises a number of teeth along an outer edge.

7. The apparatus of claim 1, wherein the disc is constructed of plastic.

8. The apparatus of claim 1, wherein the wedge is integral to the shaft.

9. The apparatus of claim 1, wherein the recess has two differently tapered sections, a first section more widely tapered to initially receive the wedge and a second section more narrowly tapered.

10. An apparatus for turning a shaft, the apparatus comprising:
a shaft having a longitudinal axis;
a gear having a longitudinal axis, wherein the gear comprises:
a first side facing the shaft, wherein:
the first side has a groove centered around the longitudinal axis of the gear;
the groove is to receive the shaft; and
the groove defines an inner hub of the gear; and
a second side facing away from the shaft, the second side having a portion defining a recess at the longitudinal axis; and
a wedge, inserted into the recess to press an outer diameter of the inner hub of the gear against an inside diameter of the shaft;
wherein the wedge is integral to the shaft.

11. The apparatus of claim 10, wherein a portion of the shaft is solid.

12. The apparatus of claim 11, wherein the inner hub comprises a number of segments, each segment pressing against the inside diameter of the shaft.

13. The apparatus of claim 10, wherein the wedge is a separate component from the gear and the shaft.

14. The apparatus of claim 10, wherein the inner hub of the gear is divided into a plurality of sections, each section being created by dividing the inner hub across a full diameter of the inner hub.

15. The apparatus of claim 10, wherein the shaft has a lower thermal expansion rate than does the gear.

16. An apparatus for turning a shaft, the apparatus comprising:
a shaft having a longitudinal axis, wherein a portion of the shaft is solid;

a gear having a longitudinal axis, wherein the gear comprises:
  a first side facing the shaft, wherein:
    the first side has a groove centered around the longitudinal axis of the gear;
    the groove is to receive the shaft; and
    the groove defines an inner hub of the gear; and
  a second side facing away from the shaft, the second side having a portion defining a recess at the longitudinal axis;
a wedge, inserted into the recess to press an outer diameter of the inner hub of the gear against an inside diameter of the shaft; and
a number of radially-distributed ribs along a bottom surface of the groove to create collection cavities that collect debris.

\* \* \* \* \*